(12) United States Patent
Park et al.

(10) Patent No.: US 11,027,348 B2
(45) Date of Patent: Jun. 8, 2021

(54) MACHINE FOR CUTTING NOZZLES OF REACTOR VESSELS

(71) Applicant: DOOSAN HEAVY INDUSTRIES & CONSTRUCTION CO., LTD., Changwon-si (KR)

(72) Inventors: Kwang Soo Park, Seoul (KR); Hae Woong Kim, Yangju-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 227 days.

(21) Appl. No.: 16/028,404

(22) Filed: Jul. 5, 2018

(65) Prior Publication Data

US 2019/0061029 A1 Feb. 28, 2019

(30) Foreign Application Priority Data

Aug. 30, 2017 (KR) .......................... 10-2017-0110212

(51) Int. Cl.
*B23D 59/00* (2006.01)
*B23D 57/00* (2006.01)
(Continued)

(52) U.S. Cl.
CPC ......... *B23D 59/006* (2013.01); *B23D 53/003* (2013.01); *B23D 53/04* (2013.01);
(Continued)

(58) Field of Classification Search
CPC ............ B23D 57/0023; B23D 57/0084; B23D 57/0053; B23D 57/00641; B23D 57/0069;
(Continued)

(56) References Cited

U.S. PATENT DOCUMENTS 3,350,970 A * 11/1967 Glastra .................... B26D 7/20
83/424
5,329,562 A * 7/1994 Kubo ................. B23D 57/0023
376/260
(Continued)

FOREIGN PATENT DOCUMENTS

CN 206775836 U * 12/2017
EP 0433956 A1 * 6/1991 ......... B23D 57/0023
(Continued)

OTHER PUBLICATIONS

English translation of publication JP01199799A. (Year: 1989).*

*Primary Examiner* — Jennifer B Swinney
(74) *Attorney, Agent, or Firm* — Investone Patent, LLC

(57) ABSTRACT

Disclosed herein is a machine for cutting nozzles of reactor vessels. The machine for cutting nozzles of reactor vessels comprises a cutting unit positioned at an upper surface edge of a reactor vessel having a nozzle and having a saw blade part having different contact areas to cut the nozzle, a drive unit providing the saw blade part with rotary power, and a foreign substance suction unit provided at one end of the cutting unit in contiguity with the saw blade part to suck foreign substances generated when the nozzle is cut by the saw blade part, wherein the foreign substance suction unit sucks the foreign substances by approaching an outer peripheral surface of the nozzle when the saw blade part moves in a cutting direction of the nozzle.

17 Claims, 15 Drawing Sheets

(51) Int. Cl.
*G21D 1/00* (2006.01)
*B23D 53/04* (2006.01)
*B23D 53/08* (2006.01)
*B23D 53/00* (2006.01)
*B23D 55/02* (2006.01)
*B23D 55/10* (2006.01)

(52) U.S. Cl.
CPC ......... *B23D 53/08* (2013.01); *B23D 57/0007* (2013.01); *B23D 57/0084* (2013.01); *G21D 1/003* (2013.01); *B23D 55/02* (2013.01); *B23D 55/10* (2013.01); *B23D 57/0069* (2013.01)

(58) Field of Classification Search
CPC .. B23D 57/007; B23D 59/006; B23D 53/003; B23D 53/04; B23D 53/08; B23D 55/10; B28D 1/08; B28D 1/088; G21D 1/003; B05B 1/20
See application file for complete search history.

(56) References Cited

U.S. PATENT DOCUMENTS

| | | | |
|---|---|---|---|
| 8,651,098 B2 * | 2/2014 | Shae | B23D 57/0007 125/21 |
| 2014/0157964 A1 * | 6/2014 | Davis | B23D 57/0007 83/56 |
| 2018/0036852 A1 * | 2/2018 | Padget | B23Q 11/0071 |
| 2018/0326590 A1 * | 11/2018 | Masuda | B24B 27/00 |

FOREIGN PATENT DOCUMENTS

| | | | | |
|---|---|---|---|---|
| EP | 1598161 A1 * | 11/2005 | | |
| JP | 01199799 A * | 8/1989 | ......... | B23Q 17/2233 |
| JP | 06-299709 A | 10/1994 | | |
| KR | 10-0806573 B1 | 2/2008 | | |

* cited by examiner

[Fig. 1]
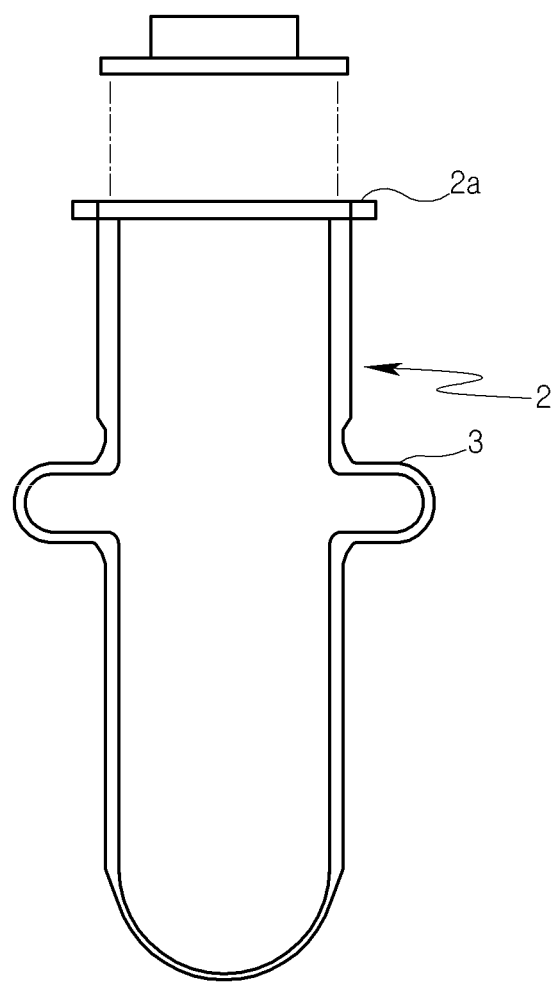

[Fig. 2]
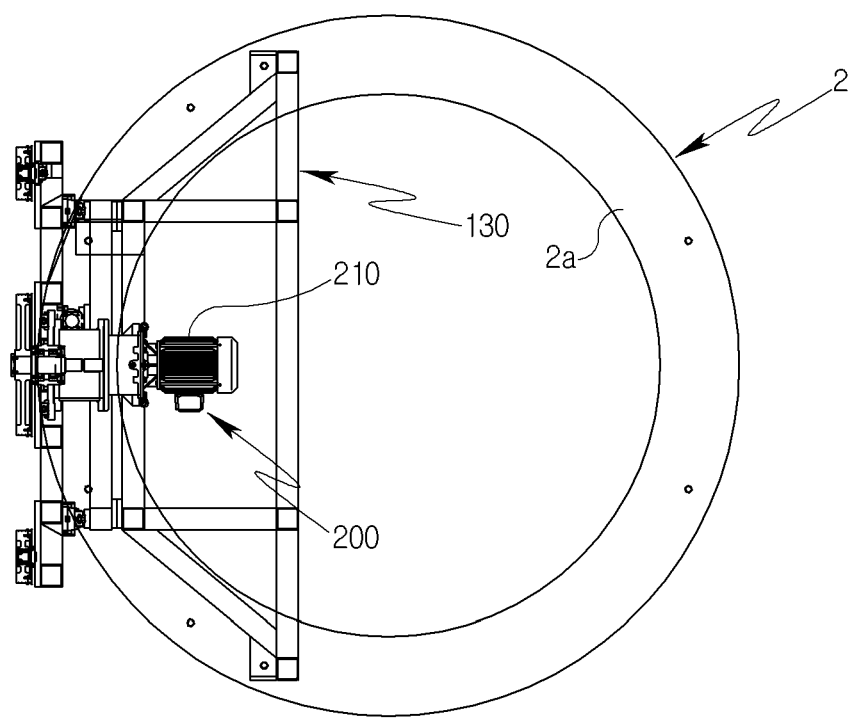

[Fig. 3]
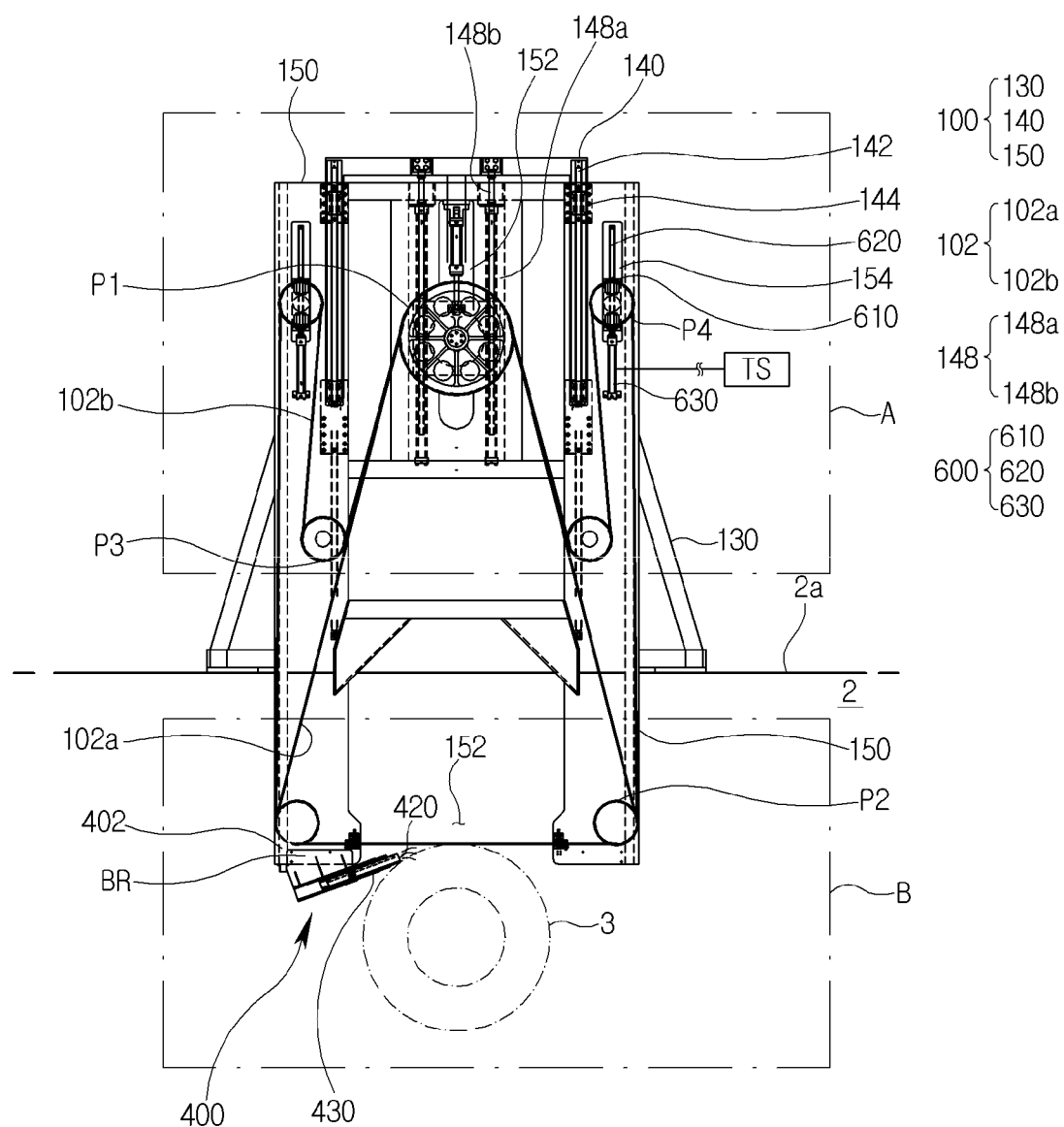

[Fig. 4]
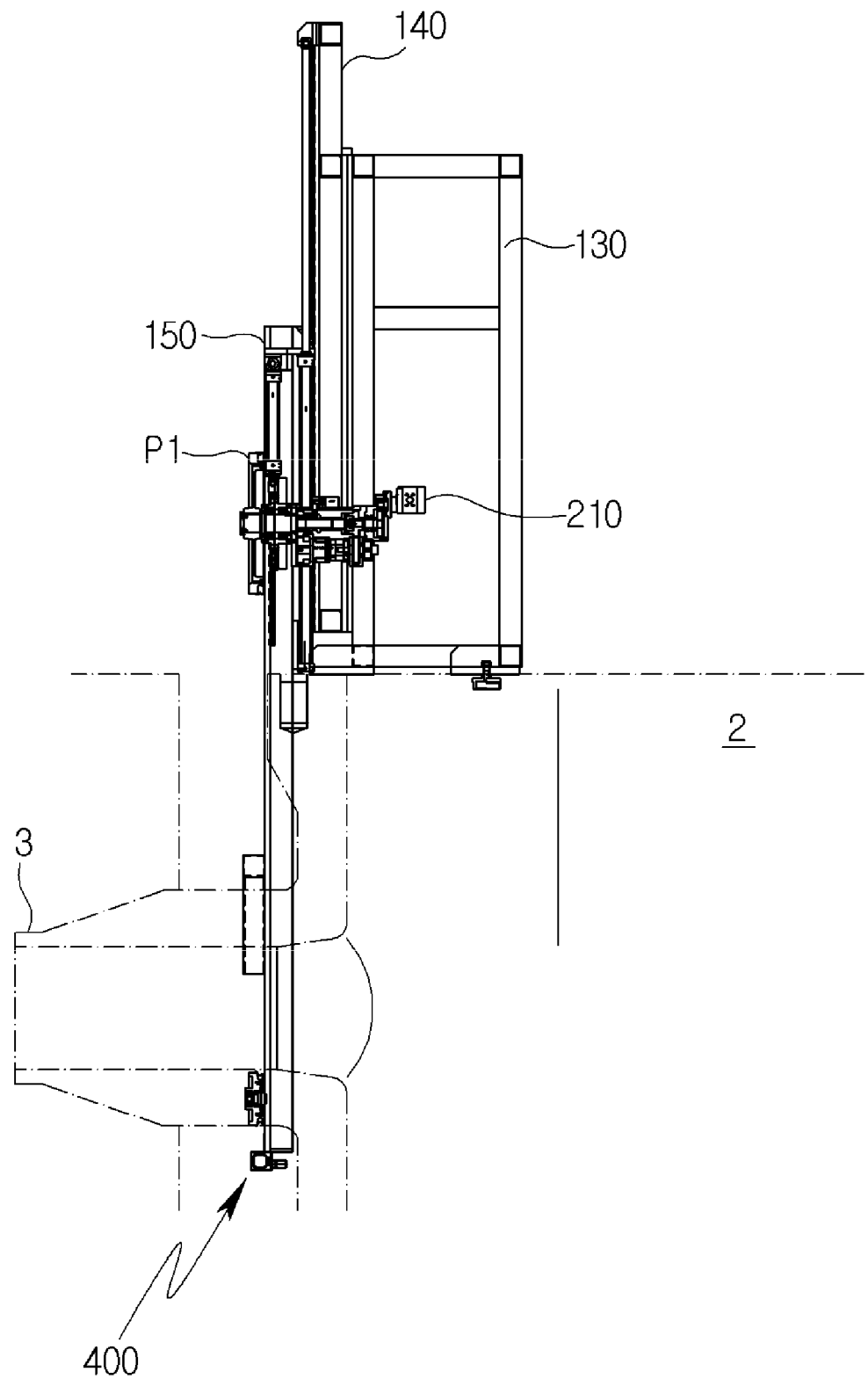

[Fig. 5]
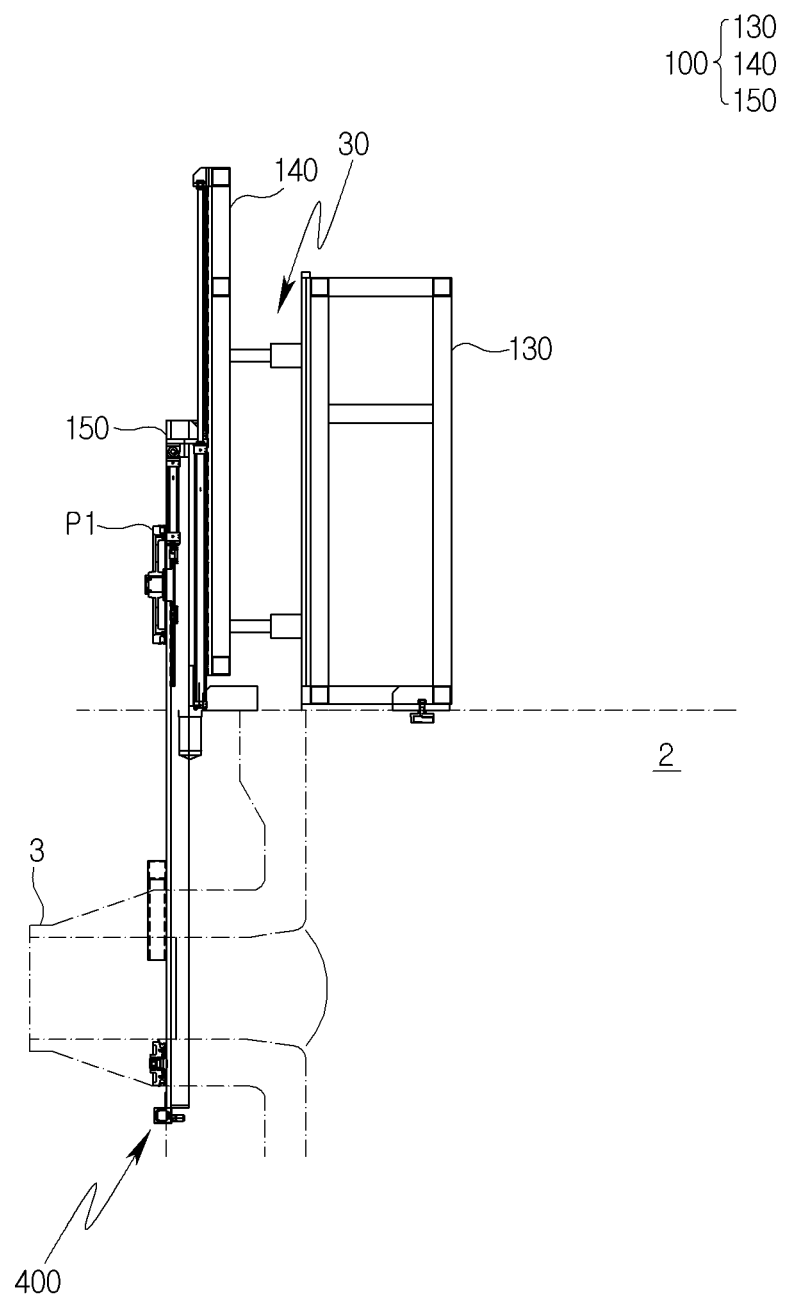

[Fig. 6]
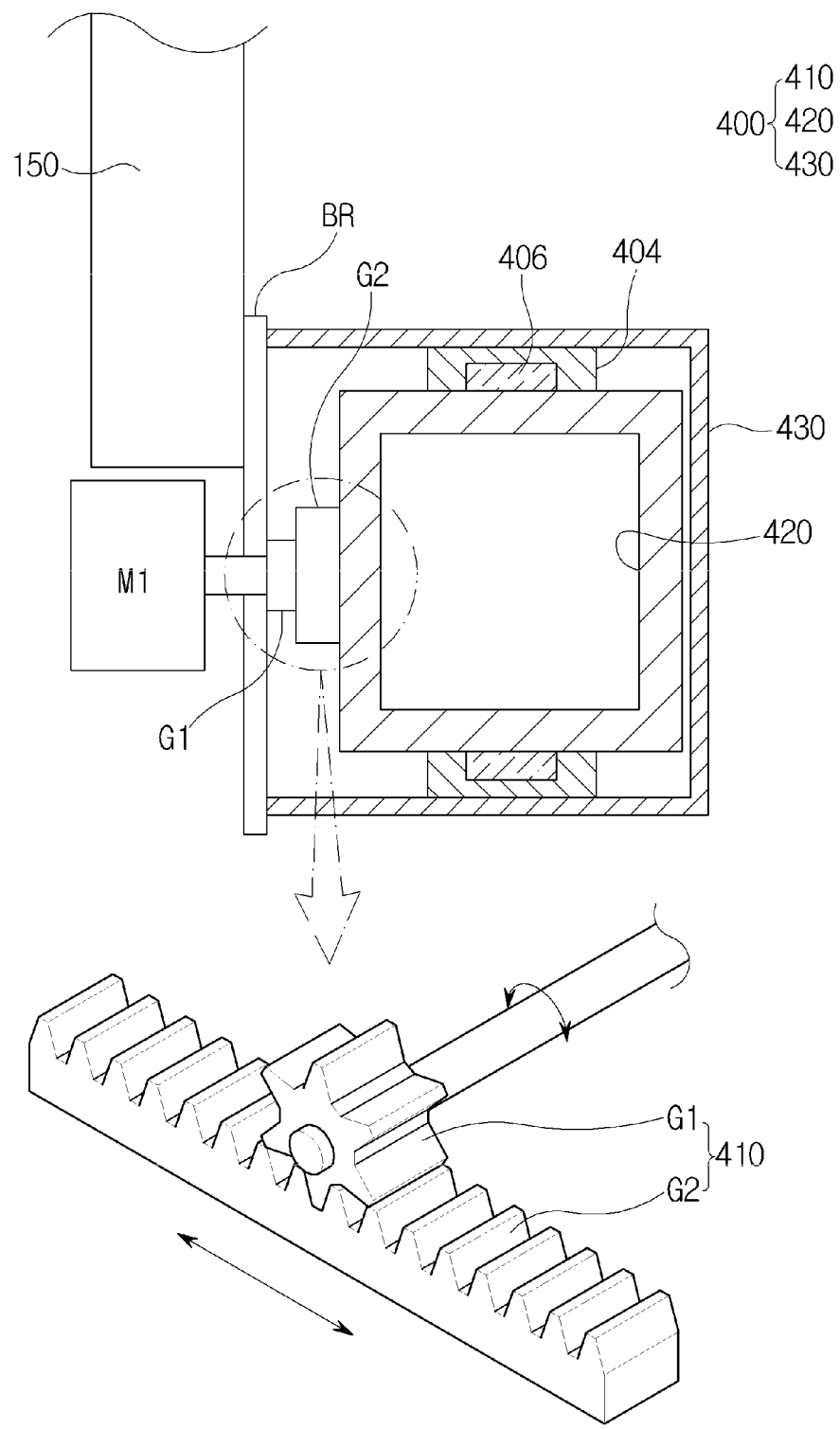

[Fig. 7]
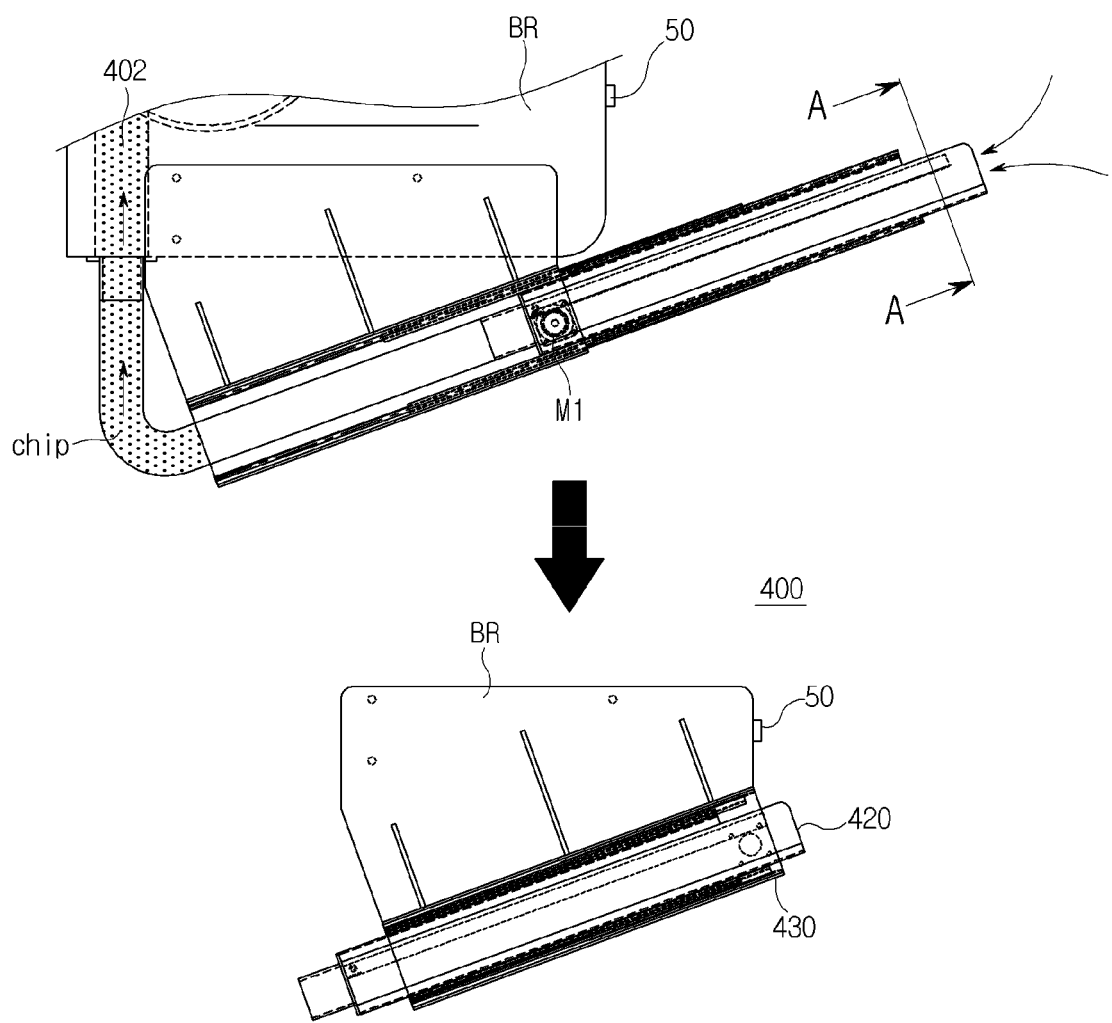

[Fig. 8]
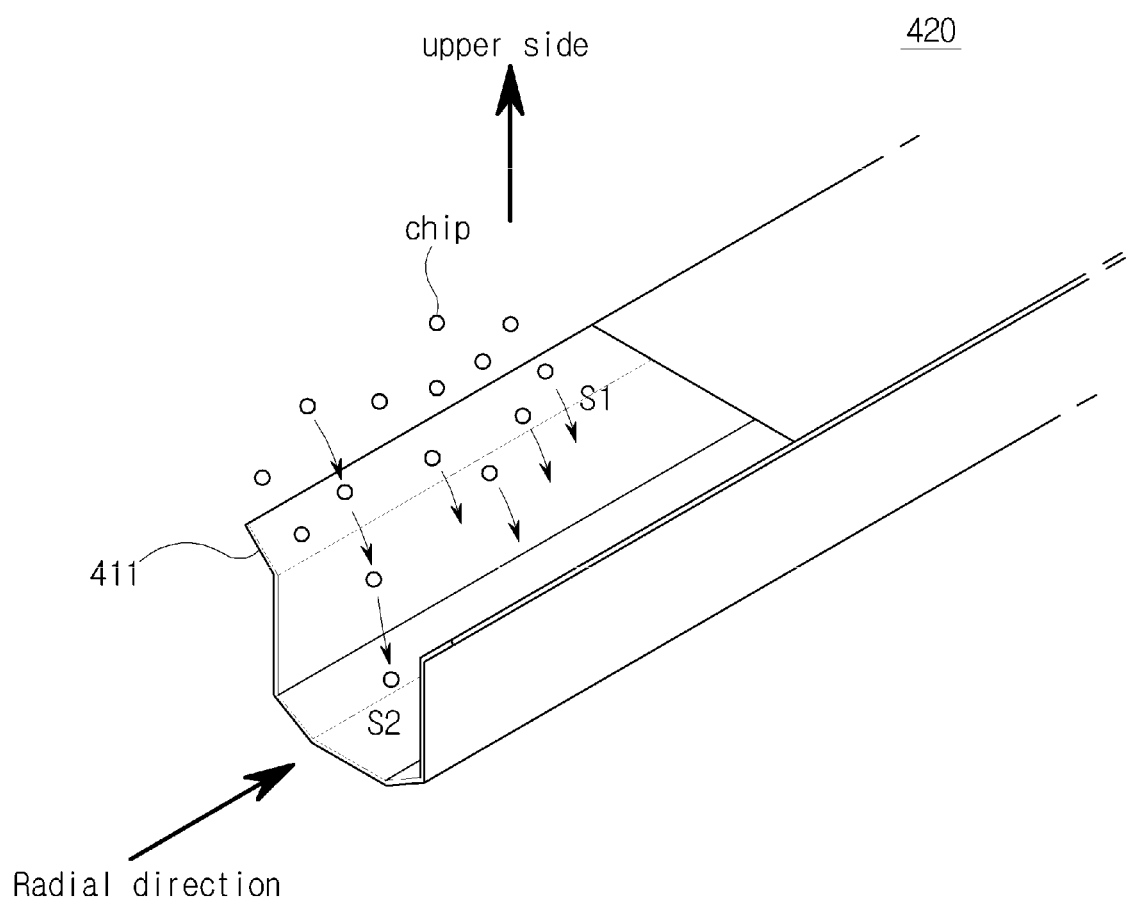

[Fig. 9]
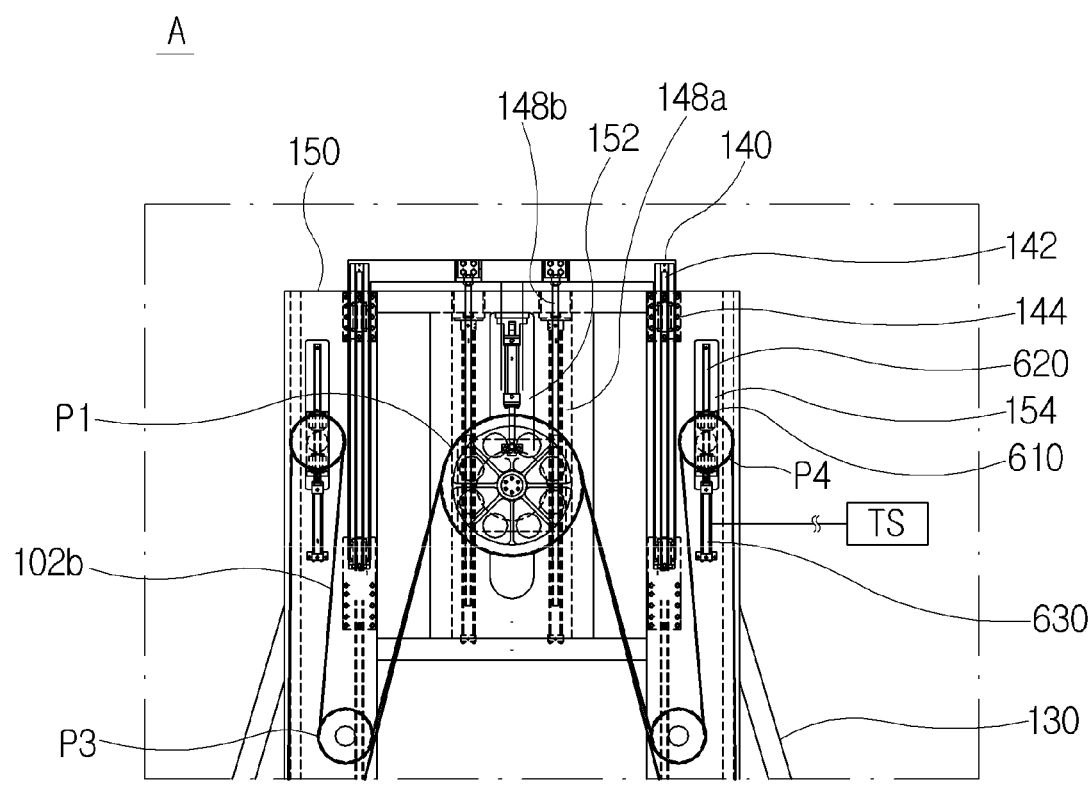

[Fig. 10]
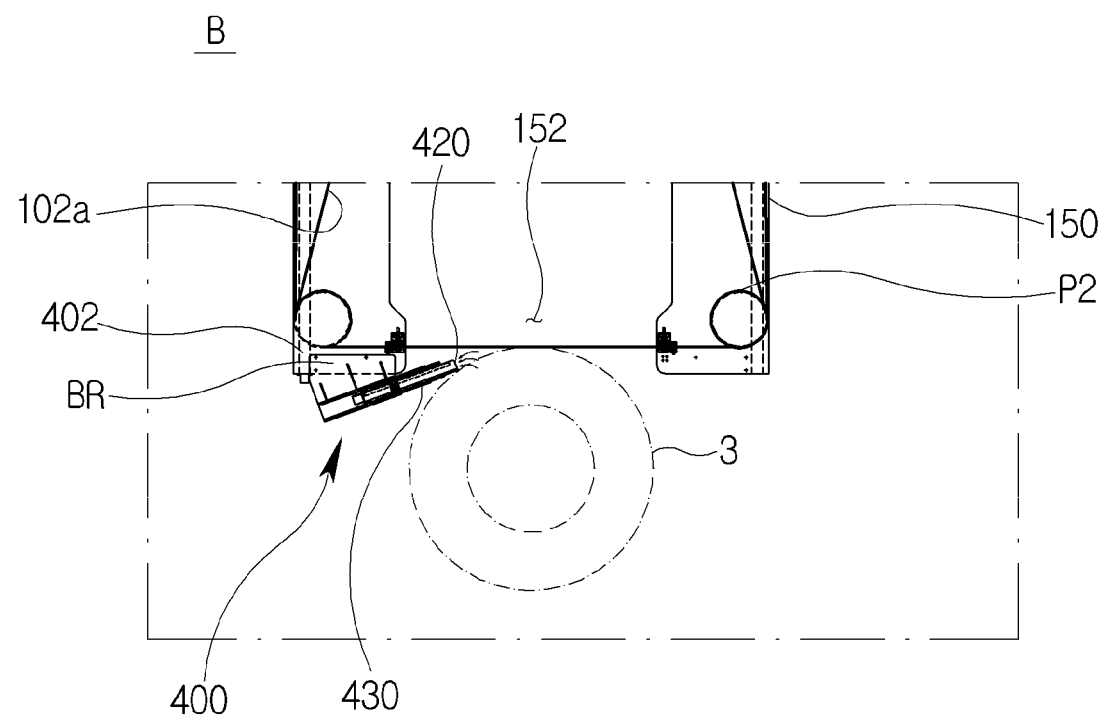

[Fig. 11]
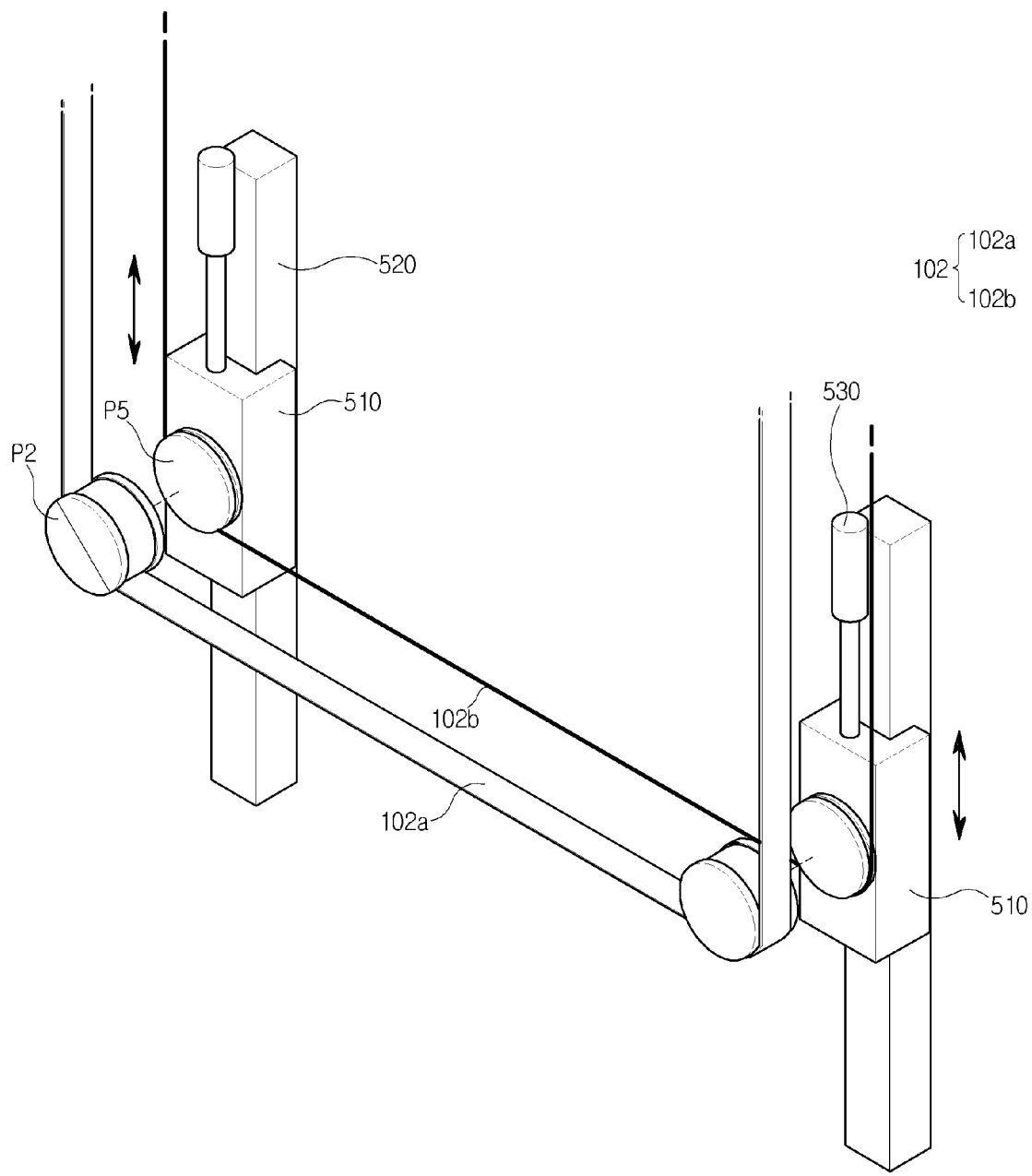

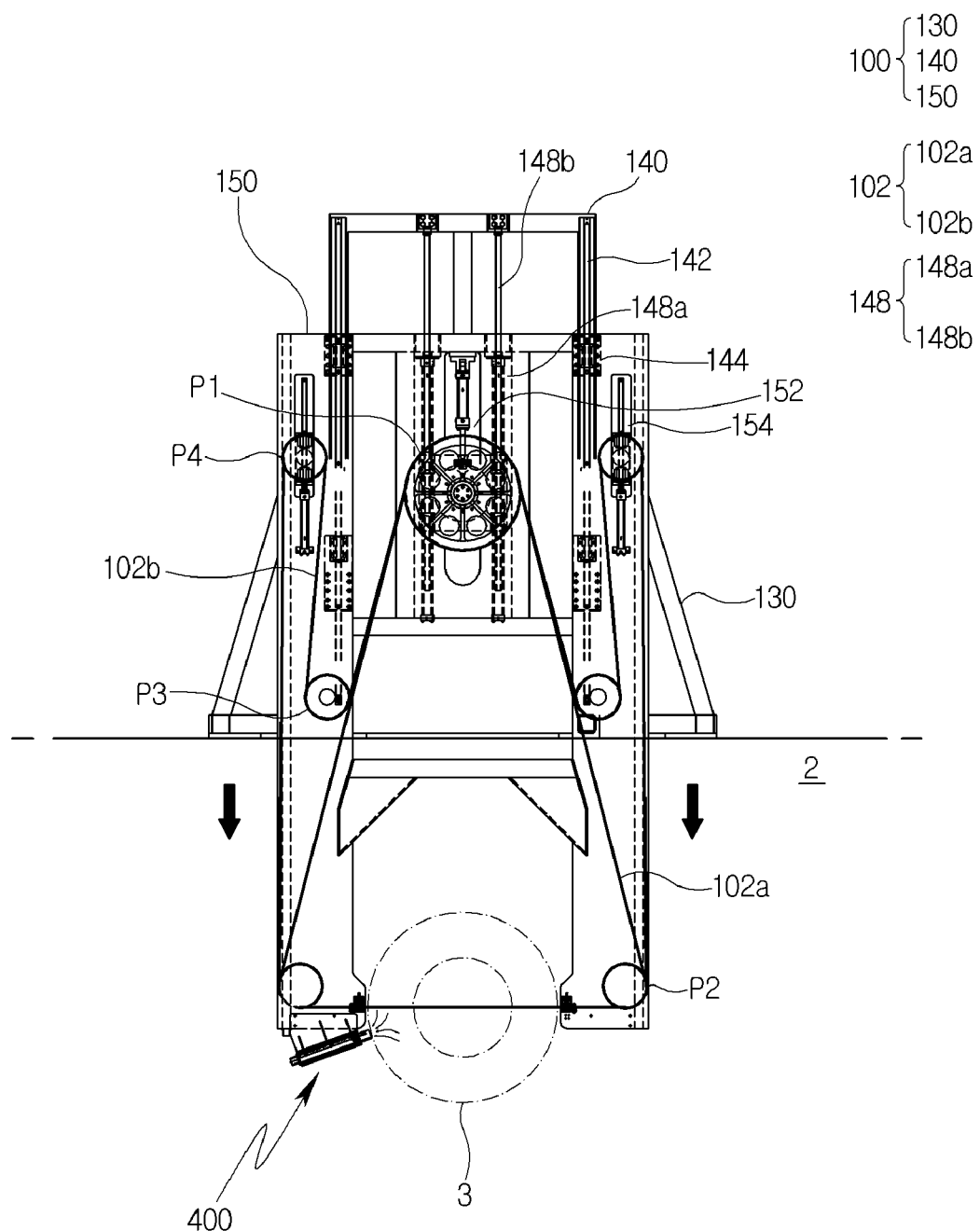
[Fig. 12]

[Fig. 13]
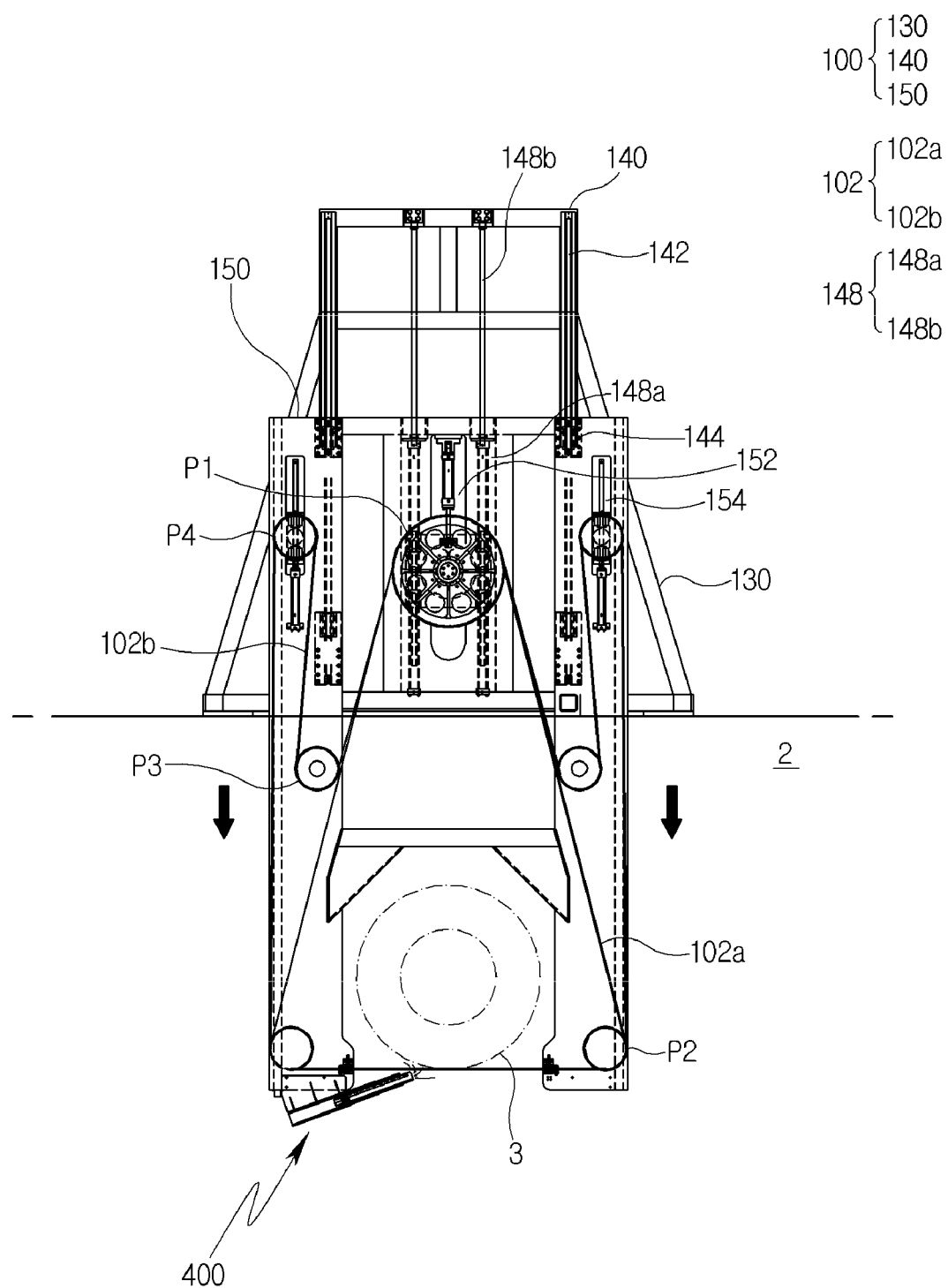

[Fig. 14]
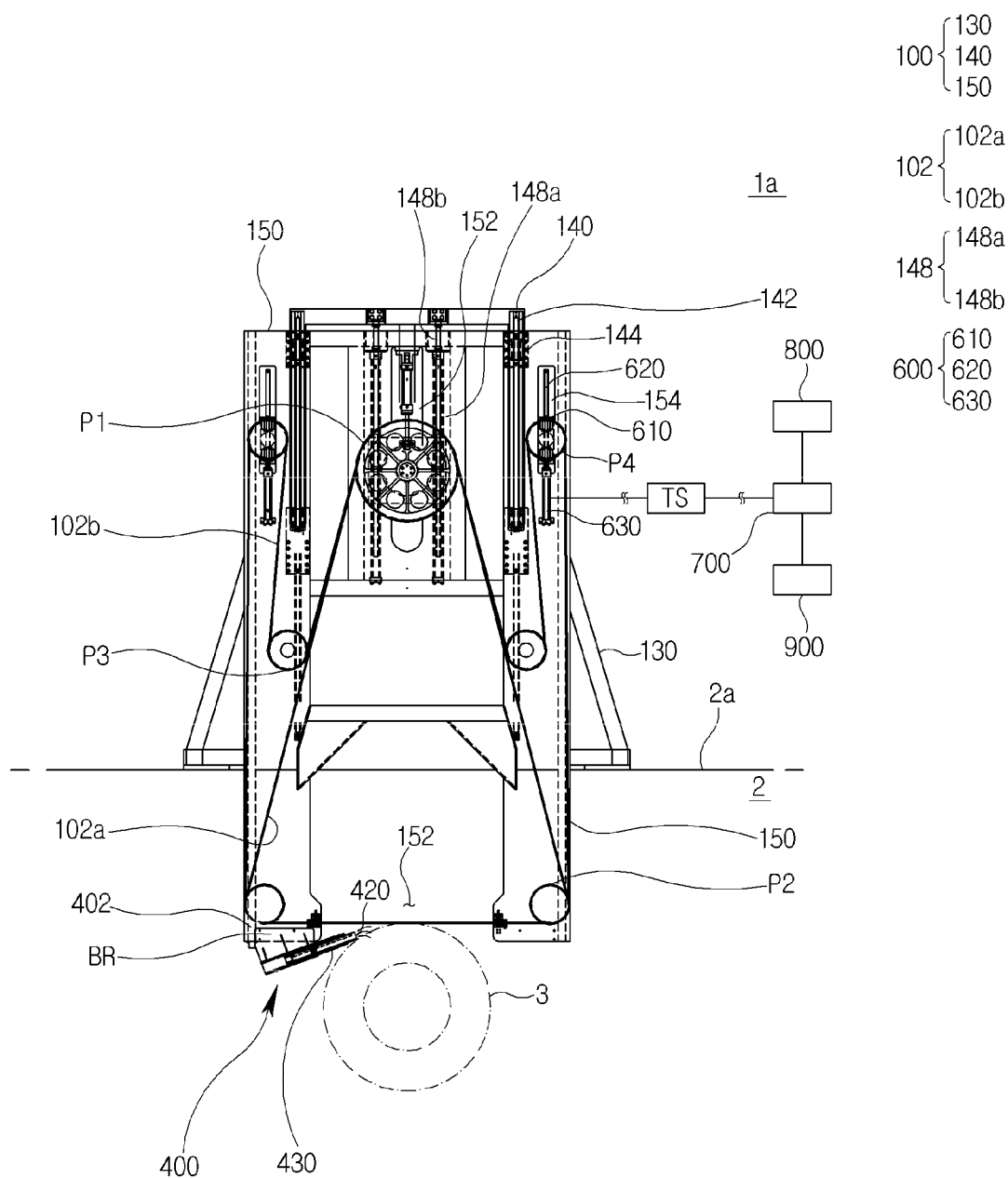

[Fig. 15]
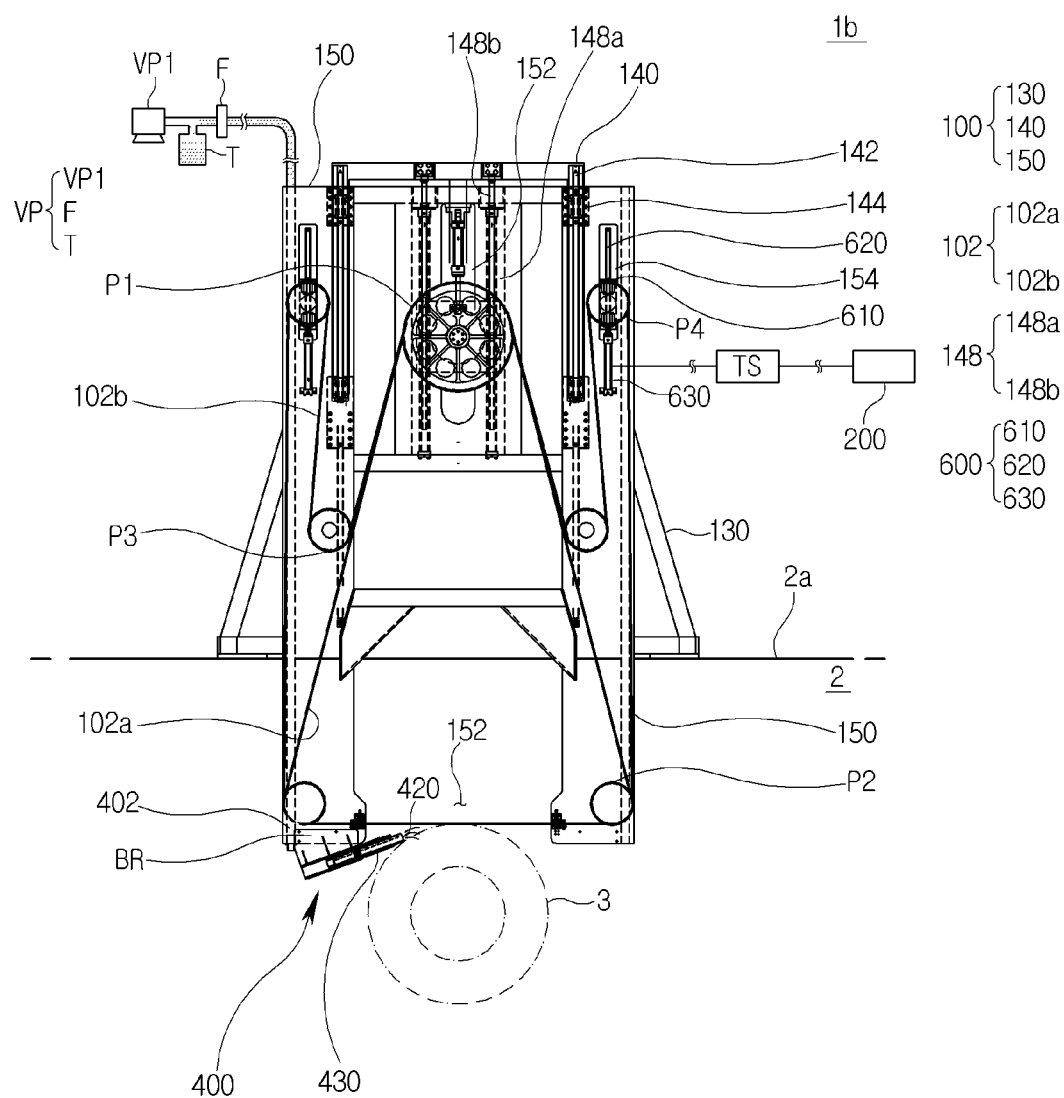

MACHINE FOR CUTTING NOZZLES OF REACTOR VESSELS

CROSS-REFERENCE TO RELATED APPLICATION(S)

This application claims priority to Korean Patent Application No. 10-2017-0110212, filed on Aug. 30, 2017 the disclosure of which is incorporated herein by reference in its entirety.

BACKGROUND OF THE DISCLOSURE

Field of the Disclosure

Exemplary embodiments of the present disclosure relate to a machine for cutting nozzles of reactor vessels, which is capable of carrying out cutting work while stably sucking foreign substances generated when cutting a nozzle included in a reactor vessel by means of a plurality of saws having different properties.

Description of the Related Art

A reactor is a system designed to continuously generate nuclear fission, and it is controllable for use in the generation of heat, the production of radioactive isotopes or plutonium, the generation of strong nuclear radiation, or other useful purposes.

The reactor comprises a vessel in which a nuclear fuel assembly and a control rod assembly are supported by an internal structure. The nuclear fuel assembly comprises a plurality of fuel rods, where uranium pellets as fission energy are inserted into each of the fuel rods, and each of the fuel rods is of an elongated shape that has an inner diameter of about 10 mm, a thickness of about 0.5 mm, and a length of about 4000 mm.

The control rod assembly is a core component of nuclear power plant, which is mounted at the top of the reactor for control of reactor reactivity and serves to adjust power enhancement, core reactivity, etc. by absorbing neutrons at the time of nuclear fission and to stop the operation of the reactor by automatically dropping them in the event of accidents.

The internal structure supports the nuclear fuel assembly in the reactor, serves as a passage when coolant is introduced into and discharged from the reactor while guiding the control rod assembly during insertion into or withdrawal from nuclear fuel, and serves to support a variety of instruments in the nuclear fuel.

It is very difficult for a worker to approach the core equipment of the nuclear power plant because it has high-level radioactivity. For this reason, remotely operable cutting devices are used during dismantlement of the nuclear power plant.

However, in order to install the remote cutting devices in the vicinity of the core equipment of the nuclear power plant, the worker must directly enter the dismantlement area of the nuclear power plant. In addition, this working requires a significant amount of time because the worker wears a radiation protective gear or due to other reasons.

By way of example, reactor vessels are coupled to each other by connecting their upper heads in a flange coupling manner. In particular, flanges are formed on the opposite surfaces of the reactor vessels, the upper heads of which face each other, and each of the reactor vessels has nozzles formed at the outside thereof for introduction and discharge of the coolant.

The reactor vessel must be cut for each predetermined size or position when it is necessary to dismantle the reactor vessel, in which case the nozzles must be cut by means of saw blades having different properties when intending to cut them.

SUMMARY OF THE DISCLOSURE

Conventionally, wire saws or band saws are used, or the wire saws are primarily used and the band saws are secondarily used in order to cut the nozzles for cutting of the reactor vessel. In this case, the worker approaches the place where the reactor vessel is positioned for replacement of saw blades since the saw blades must be replaced in case of using only one cutting method or two cutting methods.

In this case, the worker may be exposed to radioactivity, or working hours may be delayed while the worker performs the cutting work in the place where the reactor vessel is positioned for a certain time.

Accordingly, there is a need for measures capable of safely cutting the nozzles comprised in the reactor vessel without exposing the worker to radioactivity. In addition, there is a need for measures to prevent foreign substances generated when cutting the nozzles from dispersing as they are in the working site.

An object of the present disclosure is to provide a machine for cutting nozzles of reactor vessels, which is capable of preventing worker's contamination and exposure of workers to radioactivity by stably collecting foreign substances dispersed when cutting a nozzle comprised in a reactor vessel.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a machine for cutting nozzles of reactor vessels comprises a cutting unit (100) positioned at an upper surface edge of a reactor vessel (2) having a nozzle (3) and having a saw blade part (102) having different contact areas to cut the nozzle (3), a drive unit (200) providing the saw blade part (102) with rotary power, and a foreign substance suction unit (400) provided at one end of the cutting unit (100) in contiguity with the saw blade part (102) to suck foreign substances generated when the nozzle (3) is cut by the saw blade part (102). The foreign substance suction unit (400) sucks the foreign substances by approaching an outer peripheral surface of the nozzle (3) when the saw blade part (102) moves in a cutting direction of the nozzle (3).

The cutting unit (100) may comprise a first frame (130) supported on an upper surface of the reactor vessel (2), a second frame (140) vertically connected to the first frame (130) while facing the outside of the reactor vessel (2), and a third frame (150) positioned in the front of the second frame 140 while comprising pieces facing each other, and having an opening (152) formed at its lower end in an introduction direction of the nozzle (3) such that the nozzle (3) is inserted into the opening (152).

The second frame (140) may be provided with a transfer cylinder (30) for moving the third frame (150) in a forward or backward direction to adjust a cutting length of the nozzle (3) to an arbitrary position according to its protruding direction.

The third frame (150) may be provided with a sensor (50) for detecting a distance between the nozzle (3) and the foreign substance suction unit (400).

The foreign substance suction unit (400) may be connected through a support bracket (BR) disposed at the lower end of the third frame (150) with respect to the front thereof, and move forward or backward toward the nozzle (3) to suck foreign substances.

The machine may comprise a first motor (M1) disposed outside the support bracket (BR), a rotary power converter (410) receiving rotary power generated in the first motor (M1) to convert the rotary power into a rectilinear reciprocating motion, a foreign substance suction pipe (420) connected to the rotary power converter (410) and moving toward the nozzle (3) by forward or reverse rotation of the first motor (M1), and an outer cover (430) enclosing the foreign substance suction pipe (420).

The machine may comprise a first guide (404) disposed in an inward longitudinal direction of the outer cover (430), and a second guide (406) disposed outside the foreign substance suction pipe (420) and coupled to the first guide (404) to move relative thereto.

The foreign substance suction pipe (420) may have a first suction region (S1) defined to be open upward of the nozzle (3) by a predetermined length in a longitudinal direction of the foreign substance suction pipe (420) from its end extending toward the nozzle (3), and a second suction region (S2) defined to be open at the end of the foreign substance suction pipe (420) extending toward the nozzle (3).

The second suction region (S2) may be open to suck foreign substances generated in a radial direction of the nozzle (3) when the nozzle (3) is cut by the saw blade part (102), and the first suction region (S1) may be open to suck foreign substances generated in the radial direction of the nozzle (3) and in an upward direction of the foreign substance suction pipe (420) when the nozzle (3) is cut by the saw blade part (102).

The foreign substance suction pipe (420) may have left and right slopes (411), each being inclined at a predetermined angle outward from the front thereof, and foreign substances may be guided inward by the slopes (411).

The foreign substance suction unit (400) may comprise a vacuum suction pipe (402) disposed at one side of the third frame (150) and connected to the foreign substance suction pipe (420) to suck foreign substances, sucked into the foreign substance suction pipe (420), by vacuum pressure.

The saw blade part (102) may be disposed in the front of the third frame (150), and may comprise a first saw blade (102a), extending with a predetermined width while being made in the form of a band, and a second saw blade (102b) having a predetermined diameter.

The first saw blade (102a) may use a band saw and the second saw blade (102b) may use a wire saw.

The machine may comprise a first pulley (P1) positioned at a front upper side of the third frame (150) and axially coupled to a rotary shaft formed in the drive unit (200), the first saw blade (102a) being wound around the first pulley (P1), second pulleys (P2) spaced downward from the first pulley (P1) and positioned to left and right sides of the third frame (150) to face each other, the first saw blade (102a) passing through the first pulley (P1) being wound around the second pulleys (P2), third pulleys (P3) disposed between the first and second pulleys (P1 and P2) and spaced downward from the first pulley (P1) to face each other, the second saw blade (102b) being wound around the third pulleys (P3), fourth pulleys (P4) positioned above the third pulleys (P3) and spaced apart from each other to face each other, the second saw blade (102b) passing through the third pulleys (P3) being wound around the fourth pulleys (P4), and fifth pulleys (P5) positioned to face the second pulleys (P2), the second saw blade (102b) passing through the fourth pulley (P4) being wound around the fifth pulleys (P5).

The third frame (150) may comprise a first guide slot (152) that is open vertically by a predetermined length with respect to an insertion position of the first pulley (P1), and second guide slots (154), each of which is open vertically by a predetermined length with respect to an insertion position of an associated one of the fourth pulleys (P4).

The second frame (140) may be equipped with a first actuator (148) that moves the third frame (150) down or up toward the nozzle (3).

The machine may comprise a first support block (510) axially coupled to each of the fifth pulleys (P5) in the third frame (150), a first slide rail (520) coupled to the first support block (510) and extending in a vertical direction of the third frame (150), and a first cylinder (530) coupled to one side of the first support block (510) and moving the first support block (510) along the first slide rail (520) to move the second saw blade (102b) in a longitudinal upward or downward direction of the third frame (150).

The first cylinder (530) may move the fifth pulley (P5) along the first slide rail (520) in the upward direction of the third frame (150) when it is necessary to cut the nozzle (3) by the first saw blade (102a), whereas the first cylinder (530) may move the fifth pulley (P5) along the first slide rail (520) in the downward direction of the third frame (150) when it is necessary to cut the nozzle (3) by the second saw blade (102b).

The third frame (150) may be equipped with a tension adjustment unit (600) for adjusting tension of the second saw blade (102b).

The tension adjustment unit (600) may comprise a second support block (610) axially coupled to each of the fourth pulleys (P4), a second slide rail (620) coupled to the second support block (610) and extending in a vertical direction of the third frame (150), and a first tension adjustment cylinder (630) coupled to one side of the second support block (610) and moving the second support block (610) along the second slide rail (620) according to the tension of the second saw blade (102b).

The first tension adjustment cylinder (630) may adjust tension in response to a signal transmitted from a tension sensor (TS) for detecting the tension of the second saw blade (102b).

The machine may comprise third guide rails (142) spaced apart from each other to front left and right sides of the second frame (140) to move the third frame (150) toward the nozzle (3), and second support blocks (144) coupled to the third guide rails (142) and moving along the third guide rails (142) when the third frame (150) moves down or up.

The machine may further comprise a vacuum pump unit (VP) for providing the foreign substance suction unit (400) with vacuum pressure.

In accordance with another aspect of the present disclosure, a machine for cutting nozzles of reactor vessels comprises a cutting unit (100) positioned at an upper surface edge of a reactor vessel (2) having a nozzle (3) and having a saw blade part (102) having different contact areas to cut the nozzle (3), a drive unit (200) providing the saw blade part (102) with rotary power, a foreign substance suction unit (400) provided at one end of the cutting unit (100) in contiguity with the saw blade part (102) to suck foreign substances generated when the nozzle (3) is cut by the saw blade part (102), and a controller (700) controlling a distance between the foreign substance suction unit (400) and the nozzle (3) such that the foreign substance suction unit (400) approaches an outer peripheral surface of the nozzle (3) to suck the foreign substances when the saw blade part (102) moves in a cutting direction of the nozzle (3).

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view schematically illustrating a reactor vessel;

FIG. 2 is a top view illustrating a machine for cutting nozzles of reactor vessels according to a first embodiment of the present disclosure;

FIG. 3 is a front view illustrating the machine for cutting nozzles of reactor vessels according to the first embodiment of the present disclosure;

FIGS. 4 and 5 are side views of the machine in FIG. 3;

FIG. 6 is a view illustrating a foreign substance suction unit according to the first embodiment of the present disclosure;

FIG. 7 is a side view illustrating the foreign substance suction unit according to the first embodiment of the present disclosure;

FIG. 8 is a perspective view illustrating the foreign substance suction pipe of FIG. 6;

FIG. 9 is an enlarged view illustrating portion "A" of FIG. 3;

FIG. 10 is an enlarged view illustrating portion "B" of FIG. 3;

FIG. 11 is a perspective view illustrating arrangement of a first saw blade wound around second pulleys and a second saw blade wound around fifth pulleys according to the first embodiment of the present disclosure;

FIGS. 12 and 13 are views illustrating a state of operation of the machine for cutting nozzles of reactor vessels according to the first embodiment of the present disclosure;

FIG. 14 is a front view illustrating a machine for cutting nozzles of reactor vessels according to a second embodiment of the present disclosure; and FIG. 15 is a front view illustrating a machine for cutting nozzles of reactor vessels according to a third embodiment of the present disclosure.

DESCRIPTION OF SPECIFIC EMBODIMENTS

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a machine for cutting nozzles of reactor vessels according to exemplary embodiments of the present disclosure will be described with reference to the accompanying drawings. FIG. 1 is a view schematically illustrating a reactor vessel. FIG. 2 is a top view illustrating a machine for cutting nozzles of reactor vessels according to a first embodiment of the present disclosure. FIG. 3 is a front view illustrating the machine for cutting nozzles of reactor vessels according to the first embodiment of the present disclosure. FIGS. 4 and 5 are side views of the machine in FIG. 3. FIG. 6 is a view illustrating a foreign substance suction unit according to the first embodiment of the present disclosure.

Referring to FIGS. 1 to 3, a machine 1 for cutting nozzles of reactor vessels according to the first embodiment of the present disclosure is provided to cut a nozzle 3 through which coolant is introduced into and discharged from a reactor vessel 2. For reference, the reactor vessel 2 has a flange 2a formed circumferentially at the upper end thereof.

A worker cuts the nozzle 3 using a saw blade part 102 for the most favorable cutting in the site situation.

To this end, the machine 1 comprises a cutting unit 100, which is positioned at the upper surface edge of the reactor vessel 2 having the nozzle 3 and has a saw blade part 102 having different contact areas to cut the nozzle 3, a drive unit 200 providing the saw blade part 102 with rotary power, and a foreign substance suction unit 400 provided at one end of the cutting unit 100 in contiguity with the saw blade part 102 to suck foreign substances generated when the nozzle 3 is cut by the saw blade part 102.

The foreign substance suction unit 400 is characterized to suck the foreign substances by approaching the outer peripheral surface of the nozzle 3 when the saw blade part 102 moves in the cutting direction of the nozzle 3 by a guide part 132.

The saw blade part 102 comprises a first saw blade 102a, which extends with a predetermined width and is made in the form of a band, and a second saw blade 102b having a predetermined diameter.

For example, the first saw blade 102a uses a band saw and the second saw blade 102b uses a wire saw. Since the first saw blade 102a is made in the form of the band, it corresponds to a saw blade having a predetermined width.

Since the first saw blade 102a has a width kept constant, it may be advantageous when cutting the nozzle 3 having a thick portion.

The second saw blade 102b uses a wire saw with a circular cross section, and the wire saw is advantageous in accurate cutting work since it makes a cut surface clean.

In the present embodiment, the length according to the extended width of the first saw blade 102a is greater than the length according to the diameter of the second saw blade 102b. The length according to the extended width of the first saw blade 102a formed of the band saw is greater than that of the second saw blade 102b formed of the wire saw.

Referring to FIGS. 4 and 5, the cutting unit 100 of FIG. 3 comprises a first frame 130 supported on the upper surface of the reactor vessel 2, a second frame 140 vertically connected to the first frame 130 while facing the outside of the reactor vessel 2, and a third frame 150 positioned in the front of the second frame 140 while comprising pieces facing each other, and having an opening 152 formed at the lower end thereof in the introduction direction of the nozzle 3 such that the nozzle 3 is inserted into the opening 152.

The first frame 130 is fixedly coupled to a flange 2a formed on the upper surface of the reactor vessel 2 by means of a bolt. Thus, the cutting unit 100 can be stably used without overturning even though the load due to the weight of the second and third frames 140 and 150 is applied to the ground.

To this end, the first frame 130 has a hole formed in a portion facing the flange 2a for insertion of the bolt, thereby enabling the worker to easily fix the first frame 130 using the bolt in the site.

The first frame 130 stands vertically on the upper surface of the reactor vessel 2, the second frame 140 is positioned in front of the first frame 130, and the third frame 150 is positioned in front of the second frame 140.

The second frame 140 is provided with a transfer cylinder 30 for moving the third frame 150 in a forward or backward direction to adjust the cutting length of the nozzle 3 to an arbitrary position according to the protruding direction thereof.

The transfer cylinder 30 may comprise a plurality of transfer cylinders to easily adjust a position for cutting the nozzle 3 in the site, thereby enabling the third frame 150 to be moved with ease in the forward or backward direction.

The transfer cylinder 30 comprises a combination of a cylinder and a piston. For example, the cylinder is fixed to the second frame 140, and the piston is fixed to the rear of the third frame 150.

For example, in the case where the piston is moving forward or backward from the second frame 140 to the third frame 150, the worker may set an accurate position according to the accurate cutting position of the nozzle 3.

The third frame 150 has the opening 152 formed at the lower side thereof when viewed from the front, so that the third frame 150 is moved freely even when it is moved down toward the nozzle 3.

The opening 152 has a size greater than the diameter of the nozzle 3 to prevent one side of the third frame 150 from being caught by or interfering with the nozzle 3 during the cutting process.

Referring to FIGS. 4 and 6 to 8, in the present embodiment, the foreign substance suction unit 400 is disposed at the front lower side of the third frame 150 to suck foreign substances, such as chips generated when the nozzle 3 is cut.

To this end, the foreign substance suction unit 400 of the present embodiment comprises a first motor M1 that is disposed outside a support bracket BR, a rotary power converter 410 that receives rotary power generated in the first motor M1 to convert the rotary power into a rectilinear reciprocating motion, a foreign substance suction pipe 420 that is connected to the rotary power converter 410 and moves toward the nozzle 3 by forward or reverse rotation of the first motor M1, and an outer cover 430 that encloses the foreign substance suction pipe 420.

The first motor M1 is installed to the support bracket BR and is provided for the longitudinal movement of the foreign substance suction pipe 420.

The rotary power converter 410 comprises, for example, a first gear G1 connected to a rotary shaft provided in the first motor M1 and a second gear G2 engaged with the first gear G1.

For example, the first gear G1 may be a spur gear, and the second gear G2 may be a rack gear. However, they may be changed to other components that can convert the rotary motion of the first motor M1 into a reciprocating motion.

When the first gear G1 is rotated clockwise or counterclockwise by the operation of the first motor M1, the rotary power converter 410 may move the foreign substance suction pipe 420 to a position adjacent to the nozzle 3 while the second gear G2 rectilinearly reciprocates by the rotary power transmitted from the first gear G1.

For reference, in order for the distance between the foreign substance suction pipe 420 and the nozzle 3 to be kept constant at a specific distance, the distance may be set by distance-based numerical data.

The amount of rotation of the first motor M1 varies with the distance data detected by a sensor 50. For example, the amount of rotation of the first motor M1 is changed depending on the distance spaced from the outer peripheral surface of the nozzle 3 in the horizontal direction.

The sensor 50 transmits a data signal indicative of the distance spaced from the nozzle 3 to the first motor M1 in the horizontal direction, and the first motor M1 is operated in response to the signal received therefrom such that the foreign substance suction pipe 420 approaches the outer peripheral surface of the nozzle 3 when the spaced distance from the nozzle 3 is increased.

On the contrary, when the foreign substance suction pipe 420 excessively approaches the nozzle 3, the amount of rotation of the first motor M1 is changed such that a preset spaced distance is maintained. In this case, since the foreign substance suction pipe 420 is repositioned at the preset spaced distance by longitudinally moving again from the nozzle 3, the distance therebetween is always kept constant.

The foreign substance suction pipe 420 is enclosed by the outer cover 430, and the second gear G2 is fixed to the side of the foreign substance suction pipe 420. Thus, the foreign substance suction pipe 420 moves forward or backward toward the nozzle 3 according to the amount of rotation of the first motor M1.

The foreign substance suction pipe 420 may be any one of circular and polygonal shapes, but is illustrated as having a square shape in the present embodiment.

The outer cover 430, which encloses the foreign substance suction pipe 420, serves to protect the foreign substance suction pipe 420, thus preventing the damage or deformation thereof.

In the present embodiment, the foreign substance suction unit 400 comprises a first guide 404 disposed in the inward longitudinal direction of the outer cover 430 such that the foreign substance suction pipe 420 is stably moved in the inward longitudinal direction of the outer cover 430. The foreign substance suction unit 400 further comprises a second guide 406 disposed outside the foreign substance suction pipe 420 and coupled to the first guide 404.

Since the second guide 406 is inserted into the first guide 404 in the present embodiment, the longitudinal movement of the foreign substance suction pipe 420 is stably guided. In addition, the foreign substance suction pipe 420 is steadily moved in the longitudinal direction thereof without moving out of the outer cover 430.

The first and second guides 404 and 406 are positioned, for example, above and beneath the foreign substance suction pipe 420, respectively, with respect to the front thereof, as illustrated in the drawing.

The first and second guides 404 and 406 are not limited to those illustrated in the drawing, and may be changed in various manners.

The third frame 150 is provided with the sensor 50 for detecting the distance between the nozzle 3 and the foreign substance suction unit 400.

The sensor 50 is, for example, an ultrasonic sensor, but may be other sensors capable of detecting a spaced distance.

Although the foreign substance suction unit 400 is illustrated as being positioned to the front left of the third frame 150 in the drawing, it may also be positioned to the right.

In addition, the foreign substance suction unit 400 may comprise foreign substance suction units positioned to respective left and right sides.

The foreign substance suction unit 400 is connected through the support bracket BR disposed at the lower end of the third frame 150 with respect to the front thereof, and moves forward or backward toward the nozzle 3 to suck foreign substances.

In the present embodiment, the distance spaced from the outer peripheral surface of the nozzle 3, which is set according to the cutting of the nozzle 3, is kept constant in order for the foreign substance suction unit 400 to stably suck foreign substances generated when the nozzle 3 is cut.

Referring to FIG. 8, the foreign substance suction pipe 420 has a first suction region S1 defined to be open upward of the nozzle 3 by a predetermined length in the longitudinal direction of the foreign substance suction pipe 420 from the end thereof extending toward the nozzle 3. The foreign substance suction pipe 420 further comprises a second suction region S2 defined to be open at the end of the foreign substance suction pipe 420 extending toward the nozzle 3.

The foreign substance suction pipe 420 has the first and second suction regions S1 and S2 to more stably suck foreign substances generated during the cutting of the nozzle 3.

The second suction region S2 is open to suck foreign substances generated in the radial direction of the nozzle 3 when the nozzle 3 is cut by the saw blade part 102.

The first suction region S1 is open to suck foreign substances generated in the radial direction of the nozzle 3 and in the upward direction of the foreign substance suction pipe 420 when the nozzle 3 is cut by the saw blade part 102.

Especially, it may be possible to stably suck foreign substances containing radioactive components only when the foreign substances falling from the upper side of the nozzle 3 and the foreign substances generated in the radial direction of the nozzle 3 are stably sucked during the cutting of the nozzle 3.

In this case, since the foreign substance is sucked by the foreign substance suction pipe 420 without dispersing or falling in the working site, it may be possible to prevent additional contamination of the machine and exposure of the worker to radioactivity.

The size of an opening in the first suction region S1 may be greater than the size of an opening in the second suction region S2 as the amount of foreign substances falling in the first suction region S1 is relatively more than those generated in the radial direction of the nozzle 3, where the first saw blade 102*a* is positioned above the foreign substance suction pipe 420.

The foreign substance suction unit 400 further comprises a vacuum suction pipe 402 which is disposed at one side of the third frame 150 and connected to the foreign substance suction pipe 420 to suck the foreign substances by vacuum pressure.

The vacuum suction pipe 402 is connected to a separate vacuum pump (not shown), thereby allowing vacuum pressure to be maintained therein.

The vacuum suction pipe 402 has a spiral groove (not shown) formed longitudinally therein to enhance suction efficiency of foreign substances. The groove enables foreign substances to rotate longitudinally in a spiral form, thereby enhancing both of movement safety and suction efficiency.

The foreign substance suction pipe 420 has left and right slopes 411 inclined at a predetermined angle outward from the front thereof, and foreign substances are guided inward by the slopes 411.

The slopes 411 allow foreign substances generated in the nozzle 3 to fall inward of the first suction region S1. A large amount of foreign substances is generated when the nozzle 3 is cut by the first saw blade 102*a*.

In connection with the falling direction and position of foreign substances, it is advantageous to move the foreign substances inward of the foreign substance suction pipe 420 as much as possible to enhance suction efficiency. In the present embodiment, it may be possible to suck a larger amount of foreign substances by expanding an angle of introduction of the foreign substance suction pipe 420 using the slopes 411 to guide foreign substances inward.

The machine will be described below with reference to FIGS. 3 and 9, where FIG. 9 is an enlarged view illustrating portion "A" of FIG. 3.

In the present embodiment, the machine comprises a first pulley P1, which is positioned at the front upper side of the third frame 150, is arranged for winding the first saw blade 102*a* therearound, and is axially coupled to the rotary shaft formed in the drive unit 200, and second pulleys P2, which are spaced downward from the first pulley P1 and are positioned to the left and right of the third frame 150 to face each other, and around which the first saw blade 102*a* passing through the first pulley P1 is wound.

The machine comprises third pulleys P3, which are disposed between the first pulley P1 and the second pulleys P2 and are spaced downward from the first pulley P1 to face each other, and around which the second saw blade 102*b* is wound. The machine further comprises fourth pulleys P4, which are positioned above the third pulleys P3 and are spaced apart from each other to face each other, and around which the second saw blade 102*b* passing through the third pulleys P3 is wound.

In addition, the machine comprises fifth pulleys P5, which are positioned to face the second pulleys P2, and around which the second saw blade 102*b* passing through the fourth pulley P4 is wound.

The first pulley P1 has a diameter greater than the second to fifth pulleys P2 to P5, and is positioned at the upper central side of the third frame 150. The first pulley P1 is rotated by the drive unit 200 as will be described later.

The first saw blade 102*a* is wound around the first and second pulleys P1 and P2, and uses a band saw with a predetermined width. The second saw blade 102*b* is wound around the third, fourth, and fifth pulleys P3, P4, and P5, and uses a wire saw.

Since the first saw blade 102*a* is wound around the first and second pulleys P1 and P2 in a triangular form, a force is applied to the first saw blade 102*a* in the 12 o'clock direction in the drawing when the nozzle 3 is cut.

The machine will be described below with reference to FIGS. 3, 10, and 11, where FIG. 10 is an enlarged view illustrating portion "B" of FIG. 3.

The fifth pulleys P5 are maintained in the state in which they are spaced backward at a predetermined distance from the second pulleys P2. Since the fifth pulleys P5 rotate freely irrespective of the rotation of the second pulleys P2, the second saw blade 102*b* stably rotates and moves irrespective of the operation of the first saw blade 102*a*.

During the cutting process of the nozzle 3 according to the present embodiment, the third frame 150 moves downward of the second frame 140, and the nozzle 3 is inserted through the above-mentioned opening 152.

In this case, in order for the third frame 150 to move downward of the second frame 140, the third frame 150 comprises a first guide slot 152, which is open vertically by a predetermined length with respect to the insertion position of the first pulley P1, and second guide slots 154, each of which is open vertically by a predetermined length with respect to the insertion position of the associated fourth pulley P4.

The first guide slot 152 is open with a length and a width illustrated in the drawing, and the second guide slot 154 is open with a length and a width illustrated in the drawing.

In the present embodiment, both the first and second saw blades 102a and 102b are usable, and their description twill be given below with reference to the accompanying drawings.

Referring to FIGS. 9 and 11, the machine according to the present embodiment comprises a first support block 510 which is axially coupled to each of the fifth pulleys P5 in the third frame 150, a first slide rail 520 which is coupled to the first support block 510 and extends in the vertical direction of the third frame 150, and a first cylinder 530 which is coupled to one side of the first support block 510 and moves the first support block 510 along the first slide rail 520 to move the second saw blade 102b in the longitudinally upward or downward direction of the third frame 150.

Since the fifth pulley P5 is axially coupled to the first support block 510, it stably rotates without affecting the operation of the second saw blade 102b.

The first slide rail 520 extends further downward than the associated second pulley P2. In this case, since the fifth pulley P5 is moved by the first cylinder 530 to a position which does not interfere with the first saw blade 102a, it may be possible to additionally cut the nozzle 3 with ease, where it is primarily cut by the first saw blade 102a.

In detail, the first cylinder 530 moves the fifth pulley P5 along the first slide rail 520 in the upward direction of the third frame 150 when it is necessary to cut the nozzle 3 by the first saw blade 102a.

In addition, the first cylinder 530 moves the fifth pulley P5 along the first slide rail 520 in the downward direction of the third frame 150 when it is necessary to cut the nozzle 3 by the second saw blade 102b. Therefore, it may be possible to cut the nozzle 3 by means of the first and second saw blades 102a and 102b.

Especially, since the nozzle 3 is primarily cut near a position to be cut by the first saw blade 102a and then cut at an accurate cutting position by the second saw blade 102b, it is possible to enhance accuracy.

In addition, since the second saw blade 102b uses a wire saw, a smaller amount of foreign substances is generated when the nozzle 3 is cut by it than when the nozzle 3 is cut by the first saw blade 102a using a band saw.

In addition, the worker does not need to approach the place where the reactor vessel 2 is positioned since the worker can cut the nozzle 3 without replacement of the second saw blade 102b. Therefore, it may be possible to prevent the exposure of the worker to radioactivity.

In addition, both of the first and second saw blades 102a and 102b are used to reduce an amount of foreign substances generated during the cutting of the nozzle 3 and for ease of use.

The third frame 150 is equipped with a tension adjustment unit 600 for adjusting the tension of the second saw blade 102b. The tension adjustment unit 600 is disposed at each of the second guide slots 154 in which the fourth pulleys P4 are positioned.

The tension adjustment unit 600 comprises a second support block 610 which is axially coupled to the second saw blade 102b, a second slide rail 620 which is coupled to the second support block 610 and extends in the vertical direction of the third frame 150, and a first tension adjustment cylinder 630 which is coupled to one side of the second support block 610 and moves the second support block 610 along the second slide rail 620 according to the tension of the second saw blade 102b.

The first tension adjustment cylinder 630 adjusts tension in response to the signal transmitted from a tension sensor TS for detecting the tension of the second saw blade 102b.

For example, the first tension adjustment cylinder 630 adjusts tension by outwardly moving a cylinder when there is a need to change the tension of the second saw blade 102b in operation in response to the data input from the tension sensor TS.

Since the first tension adjustment cylinder 630 easily moves the second support block 610 along the second slide rail 620 according to the elongation of the cylinder, the tension of the second saw blade 102b is always kept constant in the range of preset tension.

Accordingly, the second saw blade 102b can stably cut the nozzle 3 without loosening or breaking due to a change in the tension thereof.

The machine comprises third guide rails 142, which are spaced apart from each other to the front left and right sides of the second frame 140 to move the third frame 150 toward the nozzle 3, and second support blocks 144 which are coupled to the third guide rails 142 and moves along the third guide rails 142 when the third frame 150 moves down or up.

The third frame 150 moves downward of the second frame 140 when the nozzle 3 is cut by the first saw blade 102a. It may be possible to simultaneously achieve stable working environments and accuracy in cutting the nozzle 3 by moving the third frame 150 toward the nozzle 3 at a uniform speed because the third frame 150 is heavy.

Since the second support blocks 144 are coupled along the third guide rails 142 in the present embodiment, the third frame 150 is stably moved without sudden movement when it is moved toward the nozzle 3 or returned to its original position.

The third guide rails 142 are spaced apart from each other to the front left and right sides of the second frame 140. Therefore, it may be possible to prevent the third heavy frame 150 from suddenly falling during movement since the support point thereof is maintained at the upper side.

The drive unit 200 according to the present embodiment comprises a motor 210 and a torque converter that converts rotary power generated by the motor 210 into a specific torque.

The first pulley P1 is inserted into the rotary shaft extending from motor 210. When the motor 210 is operated, the rotary power thereof is transmitted to the first pulley P1 and the rotary power of the first pulley P1 is transmitted to the first and second saw blades 102a and 102b.

The first saw blade 102a is wound around the first and second pulleys P1 and P2. Thus, when the first pulley P1 rotates, the second pulleys P2 rotate together to cut the nozzle 3.

Each of the second pulleys P2 has a diameter smaller than the first pulley P1, and is positioned to the lowermost left and right sides of the cutting unit 100 when viewed from the front thereof.

The operation of the machine for cutting nozzles of reactor vessels according to the first embodiment of the present disclosure will be described with reference to the drawings.

Referring to FIGS. 3, 12, and 13, the second frame 140 is equipped with a first actuator 148 that moves the third frame 150 down or up toward the nozzle 3.

The first actuator 148 comprises a plurality of first actuators arranged vertically at the front center of the second frame 140 in the drawing. The first actuator 148 comprises, for example, a cylinder 148*a* and a piston 148*b*.

The cylinder 148*a* extends in one direction and is fixed to the second and third frames 140 and 150. The piston 148*b* is fixed to the upper end of the second frame 140 through a fixing bracket.

When the piston 148*b* is withdrawn from the cylinder 148*a*, the third frame 150 moves down toward the nozzle 3 according to the withdrawn length of the piston 148*b*.

For example, in order to cut the nozzle 3, the sensor 50 detects a spaced distance from the nozzle 3 and then transmits the detected data to the first actuator 148.

The piston 148*b* of the first actuator 148 is withdrawn out of the cylinder 148*a* according to the spaced distance from the nozzle 3, and the third frame 150 moves down along the third guide rails 142 as indicated by the arrow.

Since the first saw blade 102*a* is rotated by the first and second pulleys P1 and P2, it moves gradually down while cutting the nozzle 3 when the third frame 150 moves down in the 6 o'clock direction.

When the piston 148*b* is fully withdrawn from the cylinder 148*a*, the first saw blade 102*a* cuts the nozzle 3 while moving from the upper end of the nozzle 3 to the middle and lower end thereof.

At the same time, the chips, such as foreign substances, generated while the nozzle 3 is cut by the first saw blade 102*a* are sucked through the foreign substance suction unit 400.

Thus, all foreign substances, generated while the nozzle 3 is cut, are stably sucked through the foreign substance suction pipe 420 provided in the foreign substance suction unit 400 without falling on the floor or dispersing in all directions.

Hereinafter, a machine for cutting nozzles of reactor vessels according to a second embodiment of the present disclosure will be described with reference to the accompanying drawings. For reference, since the main components in the second embodiment are identical to those in the first embodiment, different components will be described below.

Referring to FIG. 14, the machine for cutting nozzles of reactor vessels, which is designated by reference numeral 1*a*, according to the second embodiment of the present disclosure comprises the cutting unit 100, which is positioned at the upper surface edge of the reactor vessel 2 (see FIG. 1) having the nozzle 3 (see FIG. 1) and has a saw blade part 102 having different contact areas to cut the nozzle 3, the drive unit 200 (see FIG. 2) providing the saw blade part 102 with rotary power, and the foreign substance suction unit 400 provided at one end of the cutting unit 100 in contiguity with the saw blade part 102 to suck foreign substances generated when the nozzle 3 is cut by the saw blade part 102.

The machine comprises a controller 700 that controls the distance between the foreign substance suction unit 400 and the nozzle 3 such that the foreign substance suction unit 400 approaches the outer peripheral surface of the nozzle 3 to suck the foreign substances when the saw blade part 102 moves in the cutting direction of the nozzle 3 by the guide part 132.

The machine further comprises the controller 700 in the present embodiment, and the controller 700 controls the motor 210 (see FIG. 2) and components necessary to cut the nuzzle 3.

The machine for cutting nozzles of reactor vessels 1*a* according to the second embodiment is provided to cut the nozzle 3 through which coolant is introduced into and discharged from the reactor vessel 2 (see FIG. 1). For reference, the reactor vessel 2 has a flange 2*a* formed circumferentially at the upper end thereof.

A worker cuts the nozzle 3 using the saw blade part 102 for the most favorable cutting in the site situation.

To this end, the machine 1*a* comprises the cutting unit 100, which is positioned at the upper surface edge of the reactor vessel 2 having the nozzle 3 and has the saw blade part 102 having different contact areas to cut the nozzle 3, the drive unit 200 providing the saw blade part 102 with rotary power, and the foreign substance suction unit 400 provided at one end of the cutting unit 100 in contiguity with the saw blade part 102 to suck foreign substances generated when the nozzle 3 is cut by the saw blade part 102.

The foreign substance suction unit 400 is characterized to suck the foreign substances by approaching the outer peripheral surface of the nozzle 3 when the saw blade part 102 moves in the cutting direction of the nozzle 3 by the guide part 132.

The saw blade part 102 comprises the first saw blade 102*a*, which extends with a predetermined width and is made in the form of a band, and the second saw blade 102*b* having a predetermined diameter.

For example, the first saw blade 102*a* uses a band saw and the second saw blade 102*b* uses a wire saw. Since the first saw blade 102*a* is made in the form of the band, it corresponds to a saw blade having a predetermined width.

The controller 700 is connected to an image unit 800 for providing the worker with a current cutting state as image information. Therefore, it is possible to check all processes of accurately cutting the nozzle 3 with the naked eye even when the worker is in a remote place or in a safe place from the risk of exposure to radioactivity.

The controller 700 controls the operation of the nozzle 3 to be stopped when the drive unit 200 malfunctions or there is a malfunction in the cutting unit 100 during the process of cutting the nozzle 3.

The controller 700 comprises a communication module 900 for transmitting current malfunction state information to the worker by means of a separate terminal. The communication module 900 transmits information on the current working situation of the nozzle 3 to the worker or manager located in a remote place through a separate internet network.

Accordingly, it may be possible to recognize the cutting situation of the nozzle 3 in real time even when the worker is in a remote place and to cope in the event of an emergency.

Hereinafter, a machine for cutting nozzles of reactor vessels according to a third embodiment of the present disclosure will be described with reference to the accompanying drawings.

Referring to FIG. 15, the machine for cutting nozzles of reactor vessels, which is designated by reference numeral 1*b*, according to the third embodiment of the present disclosure comprises the cutting unit 100, which is positioned at the upper surface edge of the reactor vessel 2 (see FIG. 1) having the nozzle 3 (see FIG. 1) and has the saw blade part 102 having different contact areas to cut the nozzle 3, the drive unit 200 (see FIG. 2) providing the saw blade part 102 with rotary power, the foreign substance suction unit 400 provided at one end of the cutting unit 100 in contiguity with the saw blade part 102 to suck foreign substances generated when the nozzle 3 is cut by the saw blade part 102, and a vacuum pump unit VP for providing the foreign substance suction unit 400 with vacuum pressure.

The machine comprises the controller 700 that controls the distance between the foreign substance suction unit 400 and the nozzle 3 such that the foreign substance suction unit 400 approaches the outer peripheral surface of the nozzle 3 to suck the foreign substances when the saw blade part 102 moves in the cutting direction of the nozzle 3.

The operation of the vacuum pump unit VP is controlled by the controller 700. The vacuum pump unit VP provides the foreign substance suction unit 400 with vacuum pressure to stably suck the foreign substances when the nozzle 3 is cut.

The vacuum pump unit VP comprises a vacuum pump VP1, a filter F positioned at the front end of the vacuum pump VP1, and a tank T for collecting foreign substances therein.

The machine for cutting nozzles of reactor vessels 1b according to the third embodiment is provided to cut the nozzle 3 through which coolant is introduced into and discharged from the reactor vessel 2 (see FIG. 1). For reference, the reactor vessel 2 has the flange 2a formed circumferentially at the upper end thereof.

A worker cuts the nozzle 3 using the saw blade part 102 for the most favorable cutting in the site situation.

To this end, the machine 1b comprises the cutting unit 100, which is positioned at the upper surface edge of the reactor vessel 2 having the nozzle 3 and has the saw blade part 102 having different contact areas to cut the nozzle 3, the drive unit 200 providing the saw blade part 102 with rotary power, and the foreign substance suction unit 400 provided at one end of the cutting unit 100 in contiguity with the saw blade part 102 to suck foreign substances generated when the nozzle 3 is cut by the saw blade part 102.

The foreign substance suction unit 400 is characterized to suck the foreign substances by approaching the outer peripheral surface of the nozzle 3 when the saw blade part 102 moves in the cutting direction of the nozzle 3 by the guide part 132.

The saw blade part 102 comprises the first saw blade 102a, which extends with a predetermined width and is made in the form of a band, and the second saw blade 102b having a predetermined diameter.

For example, the first saw blade 102a uses a band saw and the second saw blade 102b uses a wire saw. Since the first saw blade 102a is made in the form of the band, it corresponds to a saw blade having the predetermined width.

As illustrated in FIGS. 3 and 6 to 8, the above-mentioned foreign substance suction unit 400 is connected through the support bracket BR disposed at the lower end of the third frame 150 with respect to the front thereof, and moves forward or backward toward the nozzle 3 to suck foreign substances.

In the present embodiment, it is most preferable that the distance spaced from the outer peripheral surface of the nozzle 3, which is set according to the cutting of the nozzle 3, is kept constant in order for the foreign substance suction unit 400 to stably suck foreign substances generated when the nozzle 3 is cut.

The foreign substance suction unit 400 comprises the first motor M1 that is disposed outside the support bracket BR, the rotary power converter 410 that receives rotary power generated in the first motor M1 to convert the rotary power into a rectilinear reciprocating motion, the foreign substance suction pipe 420 that is connected to the rotary power converter 410 and moves toward the nozzle 3 by forward or reverse rotation of the first motor M1, and the outer cover 430 that encloses the foreign substance suction pipe 420.

The vacuum pump unit VP is connected to the vacuum suction pipe 402. Thus, when the vacuum pump VP1 is operated, inside of the vacuum suction pipe 402 is maintained at a predetermined vacuum pressure.

In this case, the foreign substances generated in the nozzle 3 are sucked into the foreign substance suction pipe 420 by a difference in pressure, and then move to the filter F through the vacuum suction pipe 402.

The filter F sorts only minute substances, each of which is less than or equal to a specific size, from among the foreign substances introduced into the tank T, and foreign substances, which are sized so as not to be introduced into the tank T, are filtered in difference manners in the filter F.

In this case, since the failure or malfunction of the vacuum pump VP1 is prevented when only the filter F is periodically replaced, it may be possible to stably use vacuum pump unit VP for a long time.

Since only the minute substances having passed through the filter F are introduced into the tank T, it may be possible to separate and store a large amount of foreign substances with safety.

Although the vacuum pump VP1 is illustrated as being one in the drawing, a plurality of vacuum pumps may be used and the present disclosure is not limited thereto.

When the cutting work of the nozzle 3 is fully completed, the worker collects and treats the foreign substances introduced into the tank T with safety. Then, the work is completed.

In particular, the introduction of the foreign substances into or discharge from the tank T is blocked by a separate valve (not shown) such that the foreign substances are dispersed out of the tank T. Therefore, it may be possible to prevent foreign substances from dispersing around the working site or from specific positions.

An embodiment of the present disclosure provides a method of cutting a nozzle of a reactor vessel by a cutting unit, together with the above-mentioned embodiments.

When the nozzle is cut by the cutting unit, it may be possible to cut the nozzle safe from radioactive contamination since the chips are immediately sucked through a foreign substance suction pipe without being dispersed.

In addition, the present disclosure provides a method capable of creating safe working environments because the worker is exposed to danger to the minimum during the process of cutting of the nozzle of the reactor vessel.

As is apparent from the above description, in accordance with the embodiments of the present disclosure, it may be possible to improve workability of workers since the nozzle comprised in the reactor vessel is cut while minimizing the exposure of workers to radioactivity.

In addition, the workers may not be exposed to radioactivity since the chips generated when the nozzle is cut are sucked by vacuum pressure and then safely stored in the separate tank, thereby creating safe working environments.

Although the present disclosure has been described with respect to the specific embodiments, it will be apparent to those skilled in the art that various variations and modifications may be made by adding, changing, or removing components without departing from the spirit and scope of the disclosure as defined in the following claims, and these variations and modifications fall within the spirit and scope of the disclosure as defined in the appended claims.

What is claimed is:

1. A machine for cutting nozzles of reactor vessels, the machine comprising:
a cutting unit positioned at an upper surface edge of a reactor vessel having a nozzle extending from a nozzle surface of the reactor vessel,
wherein the cutting unit includes a first frame supported on an upper surface of the reactor vessel, a second frame connected to the first frame and disposed beyond the nozzle surface in an axial direction, and a third frame coupled to the second frame and disposed beyond the second frame in the axial direction, and
wherein the third frame is configured to be movable with respect to the second frame in the cutting direction of the nozzle and includes an opening formed between a lower end of each of two opposing parts of the third frame, the opening configured to receive an insertion of the nozzle when the third frame moves toward the nozzle;
a drive unit providing a saw blade assembly with rotary power;
a first motor disposed outside a support bracket;
a rotary power converter receiving rotary power generated in the first motor to convert the rotary power into a rectilinear reciprocating motion;
a foreign substance suction unit provided at one end of the cutting unit in contiguity with the saw blade assembly to suck foreign substances generated when the nozzle is cut by the saw blade assembly, the foreign substance suction unit comprises a foreign substance suction pipe connected to the rotary power converter and moving toward the nozzle by forward or reverse rotation of the first motor;
an outer cover partially enclosing the foreign substance suction pipe; and
wherein the foreign substance suction unit sucks the foreign substances by approaching an outer peripheral surface of the nozzle when the saw blade assembly moves in a cutting direction of the nozzle,
wherein the foreign substance suction unit is connected through the support bracket disposed at the lower end of the third frame with respect to a front thereof.

2. The machine according to claim 1, wherein the second frame is provided with a transfer cylinder for moving the third frame in a forward or backward direction to adjust a cutting length of the nozzle to an arbitrary position according to a protruding direction thereof.

3. The machine according to claim 1, wherein the third frame is provided with a sensor for detecting a distance between the nozzle and the foreign substance suction unit.

4. The machine according to claim 1, further comprising:
a first guide disposed in an inward longitudinal direction of the outer cover; and
a second guide disposed outside the foreign substance suction pipe and the second guide coupled to the first guide to move relative thereto.

5. The machine according to claim 1, wherein:
the foreign substance suction pipe has a first suction region defined to be open upward of the nozzle by a predetermined length in a longitudinal direction of the foreign substance suction pipe from an end thereof extending toward the nozzle and a second suction region defined to be open at the end of the foreign substance suction pipe extending toward the nozzle;
the second suction region is open to suck foreign substances generated in a radial direction of the nozzle when the nozzle is cut by the saw blade assembly; and
the first suction region is open to suck foreign substances generated in the radial direction of the nozzle and in an upward direction of the foreign substance suction pipe when the nozzle is cut by the saw blade assembly.

6. The machine according to claim 1, wherein the foreign substance suction pipe has left and right slopes, each being inclined at a predetermined angle outward from the front thereof, and foreign substances are guided inward by the slopes.

7. The machine according to claim 1, wherein the foreign substance suction unit comprises a vacuum suction pipe disposed at one side of the third frame and connected to the foreign substance suction pipe to suck foreign substances by vacuum pressure.

8. The machine according to claim 1,
wherein the saw blade assembly is disposed in the front of the third frame, and
wherein the first saw blade is a band saw and the second saw blade is a wire saw.

9. The machine according to claim 8, further comprising:
a first pulley positioned at a front upper side of the third frame and axially coupled to a rotary shaft formed in the drive unit, the first saw blade being wound around the first pulley;
second pulleys spaced downward from the first pulley and positioned to the two parts of the third frame to face each other, the first saw blade passing through the first pulley being wound around the second pulleys;
third pulleys disposed between the first and second pulleys and spaced downward from the first pulley to face each other, the second saw blade being wound around the third pulleys;
fourth pulleys positioned above the third pulleys and spaced apart from each other to face each other, the second saw blade passing through the third pulleys being wound around the fourth pulleys; and
fifth pulleys positioned coaxially to the second pulleys, the second saw blade passing through the fourth pulley being wound around the fifth pulleys.

10. The machine according to claim 9, wherein the third frame comprises:
a first guide slot that is open vertically by a predetermined length with respect to an insertion position of the first pulley; and
second guide slots, each of which is open vertically by a predetermined length with respect to an insertion position of an associated one of the fourth pulleys.

11. The machine according to claim 10, further comprising:
a first support block axially coupled to each of the fifth pulleys in the third frame;
a first slide rail coupled to the first support block and extending in a vertical direction of the third frame; and
a first cylinder coupled to one side of the first support block and moving the first support block along the first slide rail to move the second saw blade in a longitudinal upward or downward direction of the third frame.

12. The machine according to claim 11, wherein the first cylinder moves the fifth pulley along the first slide rail in an upward direction of the third frame when it is necessary to cut the nozzle with the first saw blade, and wherein the first cylinder moves the fifth pulley along the first slide rail in the downward direction of the third frame when it is necessary to cut the nozzle by the second saw blade.

13. The machine according to claim 9, wherein the third frame is equipped with a tension adjustment unit for adjusting tension of the second saw blade, and the tension adjustment unit comprises:
- a second support block axially coupled to each of the fourth pulleys;
- a second slide rail coupled to the second support block and extending in a vertical direction of the third frame; and
- a first tension adjustment cylinder coupled to one side of the second support block and the first tension adjustment cylinder moving the second support block along the second slide rail according to the tension of the second saw blade.

14. The machine according to claim 13, wherein the first tension adjustment cylinder adjusts tension in response to a signal transmitted from a tension sensor for detecting the tension of the second saw blade.

15. The machine according to claim 1, further comprising a vacuum pump unit for providing the foreign substance suction unit with vacuum pressure.

16. The machine according to claim 1, further comprising:
- third guide rails spaced apart from each other in a longitudinal direction of the base side of the first frame and disposed in front sides of the second frame, the third guide rails facing the third frame and being configured to move the third frame toward the nozzle; and
- second support blocks disposed on the third frame and coupled to the third guide rails, the second support blocks configured to move along the third guide rails when the third frame moves down or up.

17. A machine for cutting nozzles of reactor vessels, the machine comprising:
- a cutting unit positioned at an upper surface edge of a reactor vessel having a nozzle extending from a nozzle surface of the reactor vessel,
- wherein the cutting unit includes a first frame supported on an upper surface of the reactor vessel, a second frame connected to the first frame and disposed beyond the nozzle surface in an axial direction, and a third frame coupled to the second frame and disposed beyond the second frame in the axial direction, and
- wherein the third frame is configured to be movable with respect to the second frame in a cutting direction of the nozzle and includes an opening formed between a lower end of each of two opposing parts of the third frame, the opening configured to receive an insertion of the nozzle when the third frame moves toward the nozzle;
- a drive unit providing a saw blade assembly with rotary power;
- a first motor disposed outside a support bracket;
- a rotary power converter receiving rotary power generated in the first motor to convert the rotary power into a rectilinear reciprocating motion;
- a foreign substance suction unit provided at one end of the cutting unit in contiguity with the saw blade assembly to suck foreign substances generated when the nozzle is cut by the saw blade assembly, the foreign substance suction unit comprises a foreign substance suction pipe connected to the rotary power converter and moving toward the nozzle by forward or reverse rotation of the first motor; and
- an outer cover partially enclosing the foreign substance suction pipe;
- a controller controlling a distance between the foreign substance suction unit and the nozzle such that the foreign substance suction unit approaches an outer peripheral surface of the nozzle to suck the foreign substances when the saw blade assembly moves in a cutting direction of the nozzle, wherein the foreign substance suction unit is connected through the support bracket disposed at the lower end of the third frame with respect to the front thereof.

* * * * *